United States Patent [19]

Scharf

[11] Patent Number: 5,009,878
[45] Date of Patent: Apr. 23, 1991

[54] ZIRCONIUM DIOXIDE POWDER, PROCESSES FOR ITS PREPARATION AND ITS USE FOR THE PRODUCTION OF SINTERED ARTICLES

[75] Inventor: Helmut Scharf, Aurich, Fed. Rep. of Germany

[73] Assignee: Huels Aktiengesellschaft, Marl, Fed. Rep. of Germany

[21] Appl. No.: 531,412

[22] Filed: May 31, 1990

[30] Foreign Application Priority Data

Jun. 2, 1989 [DE] Fed. Rep. of Germany ....... 3918013

[51] Int. Cl.$^5$ .............................................. C01G 25/00
[52] U.S. Cl. ............................ 423/608; 423/DIG. 12
[58] Field of Search ......................... 423/608, DIG. 12

[56] References Cited

U.S. PATENT DOCUMENTS

| | | | |
|---|---|---|---|
| 2,980,507 | 4/1961 | Rossmy | 423/608 |
| 3,634,027 | 1/1972 | Champetier et al. | 423/608 |
| 4,627,966 | 12/1986 | Micheli | 423/608 |
| 4,933,154 | 6/1990 | Kwon | 423/608 |

OTHER PUBLICATIONS

*Handbook of Preparative Inorganic Chemistry*, 2nd ed., Brauer, ed. Academic Press, 1965, pp. 1220–1221.

*Primary Examiner*—Jeffrey E. Russel
*Attorney, Agent, or Firm*—Millen, White & Zelano

[57] ABSTRACT

1. Unstablized or stablized zirconium dioxide powder and processes for its preparation.

2.1 The use of aqueous solutions and the isolation of precipitates are substantial disadvantages of conventional processes for the preparation of zirconium dioxide powders. Furthermore, the products often do not have the desired flow properties, compression properties and sinter properties owing to the lack of microcrystallinity.

2.2 By melting zirconyl chloride optionally with a stabilizer or with a precursor of a stabilizer in the presence of a diol of the general formula HO—X—OH, in which X represents a saturated hydrocarbon radical having 2 to 5 carbon atoms, evaporating off water and hydrogen chloride, calcining the reaction product at elevated temperature in an oxygen-containing gas and optionally milling the calcined residue, an unstabilized or stabilized zirconium dioxide powder having good properties can be prepared without the use of disadvantageous process measures.

2.3 The unstabilized or stabilized zirconium dioxide powder is suitable for the production of sintered articles which can be subjected to high mechanical and/or thermal stresses.

11 Claims, No Drawings

# ZIRCONIUM DIOXIDE POWDER, PROCESSES FOR ITS PREPARATION AND ITS USE FOR THE PRODUCTION OF SINTERED ARTICLES

BACKGROUND OF THE INVENTION

Zirconium dioxide is being used to an increasing extent in unstabilized or stabilized form as a ceramic material for articles which are subjected to high mechanical and/or thermal stresses. Stabilization of the desired $ZrO_2$ phases can be effected by incorporation of other oxides, such as, for example, $Y_2O_3$ or $CeO_2$, CaO and/or MgO, in the $ZrO_2$ lattice. In order for the green compact produced from the doped $ZrO_2$, for example by compression or slip casting, to have the desired sinter properties and the sintered moldings to have the required good mechanical and thermal properties, it is necessary for the oxide metered in to be distributed as uniformly as possible in the $ZrO_2$ lattice. For good processing by powder technology, the powder should be free-flowing, and the powder particles should consist of loose agglomerates to ensure good compressibility and good sinter properties.

$ZrO_2$ powders can be produced from baddeleyite (impure $ZrO_2$) or zircon sand ($ZrO_2 \cdot SiO_2$) by alkaline digestion with NaOH or $Na_2CO_2$ at high temperatures. Depending on the proportions and temperature conditions, $Na_2ZrO_3$ and $Na_2SiO_3$ and/or $Na_2ZrSiO_5$ are obtained. These compounds are hydrolyzed and the hydrated zirconium hydroxide obtained is dissolved again in sulfuric acid for further purification. Thereafter, either basic zirconium sulphate $[Zr_5O_8(SO_4)_2 \cdot H_2O]$ or basic zirconium hydroxide is precipitated with ammonia, these being finally calcined to give zirconium dioxide. These processes are expensive, and the powders obtained contain relatively large crystallites which have combined to form hard agglomerates. These powders are therefore difficult to process into high-density sintered articles.

A process having fewer steps and giving purer $ZrO_2$ involves the reaction of zircon sand with chlorine in the presence of carbon. The zirconium tetrachloride formed here is reacted with water to give zirconyl chloride, which serves as a starting compound for the preparation of $ZrO_2$ powders. Since zirconyl chloride ($ZrOCl_2 \cdot 8H_2O$) can be synthesized advantageously in large amounts, it is a starting material of commercial interest.

A frequently used process for the preparation of $ZrO_2$ powders based on zirconyl chloride comprises reacting an aqueous solution of zirconyl chloride with an aqueous solution of ammonia or of an $NH_3$ donor and calcining the basic zirconium hydroxide separated off by filtration. The disadvantage of this process is that the hydroxide precipitates obtained are difficult to filter and the calcined products are hard agglomerates.

Powders which can be more readily processed by powder technology are obtained if the zirconium hydroxide precipitated from aqueous zirconyl chloride solutions is partially dehydrated by azeotropic distillation prior to calcination. This process is modified in some cases by rendering the hydroxide chloride-free beforehand by adding nitric acid to the zirconyl chloride solution, redissolving in nitric acid the precipitate obtained on precipitation with ammonia and carrying out reprecipitation with ammonia. The zirconium hydroxide obtained is converted with citric acid into the corresponding organic complex and is dehydrated by azeotropic distillation and then calcined. These processes are labor-intensive and cause environmental pollution owing to the oxides of nitrogen.

A possible method for obtaining metal oxide powders having approximately uniform particle sizes in the submicron range consists in the hydrolysis of metal salts in aqueous solutions under severe conditions at elevated temperatures, as described by E. Matijevic in: "Monodispersed Metal (Hydrous) Oxides", Acc. Chem. Res. Vol. 14, 22–29 (1981). In this process, precipitation in an aqueous solution is carried out in such a specific and controlled manner that only a single batch of crystal seeds is formed and the further formation of solid take place through diffusion-controlled deposition on the crystal seeds. Since no further crystal seeds are formed, the originally produced crystal seeds grow into uniform, larger particles. These monodisperse particles can be produced only in very dilute solutions, and the hydrolysis conditions, such as, for example, salt concentration, type of anion, pH control, temperature, etc., must not fluctuate greatly. Monodisperse $ZrO_2$ powders have not been produced by this method to date.

European Patent 0,251,538 describes a process in which an aqueous solution of zirconyl chloride is heated for a prolonged period at temperatures below the boiling point of water. The zirconium hydroxide formed during this procedure is separated off from the solution and calcined. Particles having a diameter of 50 to 200 nm are obtained. In this process, isolation of the hydroxide particles from the solution is very difficult, and the $ZrO_2$ obtained is not stabilized. In order to stabilize it, the particles must be resuspended after calcination, laden with the hydroxide of the stabilizer by alkaline precipitation and calcined again after isolation from the solution. These additional process steps, during which the conditions must be maintained exactly, make the process even more difficult to carry out.

Earlier literature, for example the work cited in Gmelins Handbuch der anorganischen Chemie [Gmelins Handbook of Inorganic Chemistry], 8th edition, Volume 42 (Zirconium), pages 303 to 306, discloses that solid $ZrOCl_2 \cdot 8H_2O$ can be converted into $ZrO_2$ by vigorous heating with liberation of $H_2O$, HCl and possibly $ZrCl_4$. This method has not been developed into an industrial process to date. The products obtained are not high quality powders. Furthermore, subsequent, satisfactory stabilization of the $ZrO_2$ is not possible.

SUMMARY OF THE INVENTION

It was therefore the object of the present invention to provide a simple and economical process for the preparation of unstabilized or stabilized zirconium dioxide powder, which process dispenses with the preparation of aqueous solutions and the isolation of precipitates and which process leads to microcrystalline powders which contain any stabilizers present in homogeneous distribution and have good flow, compression and sinter properties.

The zirconium dioxide powder according to the invention is obtained by melting zirconyl chloride, e.g., of the formula $ZrOCl_2 \cdot 8H_2O$ in the presence of a diol of the general formula HO–X–OH, in which X represents a saturated, linear or branched hydrocarbon radical having 2 to 5 carbon atoms, evaporating off water and hydrogen chloride, calcining the reaction product at elevated temperature in an oxygen-containing gas and optionally milling the calcined residue. The invention also concerns $ZrO_2$ powder produced thereby.

The starting materials are thus a melt or solution of crystalline zirconyl chloride which is as pure as possible and the selected saturated diol having non-geminal OH groups. It is of course also possible to use a mixture of diols of the type claimed. Typical diols which may be used are, for example, ethane-1,2-diol, propane-1,2-diol and 2,2-dimethylpropane-1,3-diol.

The molar ratio of zirconyl chloride to diol may vary between 10:1 and 1:10. In principle, however, smaller and larger amounts of diol may also be used. In both cases, however, relatively hard agglomerates are obtained. Larger amounts of diols are furthermore uneconomical since the major part of the diol has to be separated off again by distillation prior to calcination, or the diol has to be incinerated during calcination. Molar ratios of between 6:1 and 1:1 are preferred, those between 5 1 and 2 1 being particularly preferred.

Depending on the intended use of the zirconium dioxide powder according to the invention or of the zirconium dioxide powder prepared according to the invention, the said powder may be stabilized to a greater or lesser extent. Conventional stabilizers are, for example, yttrium oxide ($Y_2O_3$) and cerium dioxide ($CeO_2$). As already mentioned at the outset, it is necessary for the stabilizers to be distributed as uniformly as possible in the $ZrO_2$ lattice. They are therefore mixed as such or are present as so-called precursors with the starting materials, preferably in the zirconyl chloride. Suitable precursors are, for example, the hydroxides, preferably however the chlorides, of the elements yttrium and cerium. The chlorides may be used in a form with or without water of crystallization. The stabilizer chloride is advantageously thoroughly mixed with the zirconyl chloride in a mortar or by milling and is melted together with the zirconyl chloride. Since further processing of the stabilizer chloride takes place together with the zirconyl chloride, only zirconyl chloride will be referred to below for the sake of simplicity. After the calcination, the stabilizing element is present completely or partially in oxide form.

The amount of stabilizer, for example yttrium oxide and/or cerium oxide, preferably yttrium oxide, depends on whether partially or completely stabilized zirconium dioxide powder is to be prepared. For partially stabilized $ZrO_2$, the amount of stabilizer is in general up to 7 percent by weight, in particular between 0.1 and 6 percent by weight and very particularly between 2 and 5 percent by weight, based on the ready-prepared powder. For completely stabilized $ZrO_2$, on the other hand, the amounts are between 7 and 15 percent by weight, preferably between 8 and 10 percent by weight, the limits between complete and partial stabilization being fluid and depending on the other powder properties and the sinter conditions.

The percentage of stabilizing oxide added depends on the desired tendency for stress-induced transformation, which decreases with rise of the stabilizing oxide content and influences properties like bending strength, hardness and toughness of zirconia ceramics, mainly in the case of partial stabilization, and additionally on the specification of other properties, e.g. ionic conductivity behavior, in the case of complete stabilization, as is reported in common literature of the art, e.g. in Stevens, R.; Introduction to Zirconia-Zirconia and Zirconia Ceramics, 2nd Edition, Magnesium Electron Ltd., 1986.

The melts can be produced by various methods:

1. Zirconyl chloride is melted alone. Here, the salt dissolves in its own water of crystallization, and a diol is added to this melt in solid or liquid form or as a melt, depending on the state of aggregation at room temperature.
2. The diol is initially taken in the form of a melt, and the zirconyl chloride, in solid form or as a melt, is added to this melt.
3. Zirconyl chloride and the diol in solid form at room temperature are melted together as a solid mixture. If the diol is in liquid form at room temperature, the corresponding suspension is heated by an analogous method until a clear solution has formed After the zirconyl chloride has been melted, the melt can be heated for some time with refluxing of some of the water of crystallization and, if appropriate, of some of the diol; however, it can also be evaporated down immediately. Especially towards the end, the evaporation process can be supported by the application of a vacuum. During evaporation, some of the water of crystallization and of the chloride is evaporated off in the form of hydrochloric acid and some of the diol may be evaporated off. The temperature in the melt initially remains constant during the evaporation process and increases towards the end as a function of the bath or oven temperature. The evaporation can be further accelerated by passing through a gas which is inert under the evaporation conditions, such as, for example, air or nitrogen. The bath or oven temperature can be kept constant during the evaporation or can be increased. The dried melt present in the form of a powder is then calcined in the presence of air by increasing the temperature.

The calcination temperature may vary within wide limits, depending on the desired crystallite size of the $ZrO_2$ and the hardness of the agglomerates. The lower temperature limit is determined by the condition that the carbon of the sample must undergo a very substantial combustion, and the upper limit is determined by the sinter process which takes place. Calcination temperatures of 600° to 1000° C. are preferred, those between 600° and 800° C. being particularly preferred. The calcination time depends on the calcination temperature and may be in a range commonly used in the art, i.e. between 5 and 1200 minutes at maximum temperature. The precise time necessary will depend on the properties and heating rates available of the furnace used and be between 30 and 1000 minutes for the most commercial devices. It must be such that it is sufficient at the particualar calcination temperature to ensure virtually complete combustion of the carbon. The amount of an oxygen-containing gas used for calcination, preferably air, must also be at least sufficient to ensure adequate combustion of the carbon. After the calcination, the powder obtained is brought to the desired particle size, if necessary by milling and possibly also sieving.

The process according to the invention can be carried out as a single-stage process by carrying out melting of the salt and of the diol and drying of the melt and calcining of the resulting powder in a single vessel and controlling the temperature of the apparatus by a corresponding temperature program. However, it can also be carried out as a multistage process by melting the salt and drying the melt in one apparatus, subjecting the resulting powder to a milling step and then carrying out calcination in a separate furnace. The single-stage process can be carried out, for example, in a rotary furnace, and the multistage process in a stirred vessel and a rotary kiln. Since the salt melt is very corrosive, corrosion-resistant materials must accordingly be used for the apparatuses, for example teflon, glass, quartz or enamel for the low-temperature range and alumina or zirconium oxide for the furnace.

The unstabilized or stabilized zirconium dioxide powders according to the invention have crystallite sizes of about 10 to 60 nm, depending on the preparation conditions, and possess a loose state of aggregation with, as a rule, a bimodal pore distribution. The powders can readily be compressed to give green compacts having a high density and finally lead to sintered articles which have the desired mechanical strength and heat resistance.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P 39 18 013.1, filed June 2, 1989, are hereby incorporated by reference.

The partially or fully stabilized zirconia powders produced in the described way are more homogeneous in composition and grain size distribution than powders produced according to methods of the state of the art. Therefore, they may be advantageously manufactured into ceramic parts with properties essentially better than the products available now, by common ceramic processing, e.g. dry-pressing of spray-dried powders, slip-casting, isostatic pressing etc., as is taught in the common literature of the art, e.g. Stevens R.; Introduction to Zirconia-Zirconia and Zirconia Ceramics, 2nd Edition, Magnesium Electron Ltd., 1986; Heuer, A. H. and Hobbs, L. W. (eds.), Advances in Ceramics, Vol. 3: Science and Technology of Zirconia; The American Ceramic Soc., Columbus, Ohio, 1981; Claussen, N.; Rühle, M.; Heuer, A. H. (eds.), Advances in Ceramics, Vol. 12: Science and Technology of Zirconia II; The American Ceramic Soc., Columbus, Ohio, 1983.

The abbreviations and test and measuring methods used in the application are summarized beforehand:

EDX

The distribution of elements in the samples was determined using a commercial EDAX-apparatus (type: EDAX 9900), connected to a commercial scanning electron microscope, by the method of energy-dispersive X-ray analysis (EDX). The resolution was about 25 nm.

SEM

Commercial scanning electron microscope

STEM

Commercial scanning transmission electron microscope

Pore structure distribution

The pore structure distribution was investigated using a commercial high-pressure Hg porosimeter from Carlo Erba.

Surface area

The surface area of the powder was determined using a commercial apparatus based on the BET (Brunauer-Emmett-Teller) method ($N_2$) and a commercial Hg porosimeter from Carlo Erba.

Crystal phase

The crystal structure was determined by X-ray diffraction analysis using a commercial apparatus.

Crystal diameter

The diameter of the crystallites was obtained by measuring the crystallites in the scanning transmission electron micrographs and from the individual peaks of the X-ray diffraction patterns. The diffractometer used was a commercial apparatus from Philips (type: PW 1800).

Sinter behavior

The kinetics of sintering of the samples (change in length as a function of temperature) was monitored using a commercial dilatometer from Baehr.

Chlorine content

The chlorine content of the samples was determined by the X-ray fluorescence method using a commercial apparatus.

Hardness of the agglomerates

Since there is no generally customary method for determining the hardness of the agglomerates, it was determined qualitatively—and only for the products in relation to one another—by grinding the powder between two glass discs with the fingers.

EXAMPLES

EXAMPLE 1

1000.0 g of zirconyl chloride ($ZrOCl_2.8H_2O$), 51.3 g of yttrium trichloride ($YCl_3.6H_2O$) and 80.8 g of 2,2-dimethylpropane-1,3-diol are melted in a rotating glass flask at a bath temperature of 140° C. and kept at this temperature for 15 minutes with refluxing of the escaping hydrochloric acid. The melt is then evaporated to dryness by removing the reflux condenser. Towards the end of the evaporation process, a vacuum of 5 kPa is applied. The solid product is heated for 30 minutes at 200° C., and the resulting free-flowing powder is milled and is calcined for 1 hour at 800° C. in a stream of air.

The Y content of the calcined powder is 5 percent by weight. The EDX area spectra and EDX point spectra show a homogeneous Y distribution in the $ZrO_2$, within the analytical precision. The electron micrographs (SEM and STEM) show that the powder consists of crystallites which are of almost identical size, have a diameter of 18 to 25 nm and form loose but relatively dense agglomerates. The measured crystallite diameter is confirmed by X-ray diffraction patterns. The crystallites consist of 100% tetragonal phase. The pore structure investigated using a mercury porosimeter shows an approximately bimodal pore distribution in which the first maximum is at 8 to 10 nm and the second in the $\mu m$ range. The surface area is 16.2 $m^2/g$.

EXAMPLE 2

100.0 g of $ZrOCl_2.8H_2O$, 5.13 g of $YCl_3.6H_2O$ and 8.08 g of 2,2-dimethylpropane-1,3-diol are mixed in a mortar and melted in a glass flask while stirring. The bath temperature is 140° C. The melt is refluxed for 15 minutes and then thickened by evaporating off $H_2O$ and HCl until it becomes highly viscous. The highly viscous melt is introduced into an $Al_2O_3$ crucible and calcined in a furnace for one hour at 600° C. in a stream of air. The calcined powder is milled in a ball mill and then analyzed. The powder consists of 94% tetragonal phase and the crystal diameter is 13 nm according to the X-ray diffraction spectrum. This is confirmed by the scanning transmission electron micrograph.

EXAMPLE 3

200.0 g of $ZrOCl_2.8H_2O$, 8.16 g of $YCl_3.6H_2O$ and 20.0 g of 2,2-dimethylpropane-1,3-diol are mixed in a mortar and then melted in a glass flask at a bath temperature of 140° C. while stirring and the mixture is kept at this temperature for one hour under reflux. 60 $cm^3$ of HCl-containing water are then distilled off and the product obtained is calcined in an $Al_2O_3$ crucible, first for one hour at 800° C. and then for one hour at 1000° C. in a stream of air. The powder obtained consists of 93% tetragonal phase and 7% of monoclinic phase. The scanning transmission electron micrographs indicate a crystallite thickness of 40 to 50 nm. The X-ray diffraction patterns give a mean diameter of the crystallites of 46 nm. The agglomerates are somewhat harder, and the powder exhibits slightly poorer sinter behavior in the dilatometer.

EXAMPLE 4

The experiment of Example 1 is repeated using a ratio of $ZrOCl_2.8H_2O$ to 2,2-dimethylpropane-1,3-diol of 1:1. The powder obtained has similar properties to the product described in Example 1.

EXAMPLES 5 and 6

In analogy to Example 1, two experiments are carried out in which the molar ratio of zirconium salt to diol is 10:1 and 1:6. In both cases, products having harder agglomerates and somewhat poorer sinter behavior compared with the powder of Example 1 are prepared.

EXAMPLE 7

100.0 g of $ZrOCl_2.8H_2O$, 5.13 g of $YCl_3.6H_2O$ and 8.08 g of 2,2-dimethylpropane-1,3-diol are thoroughly mixed in a mortar and melted in a three-necked flask at a bath temperature of 140° C. while stirring and refluxed for 15 minutes. After $H_2O$ and HCl have been evaporated off, the powder is heated to 200° C. and then calcined for 16 hours at 800° C. in a stream of air. No chlorine can be detected by X-ray fluorescence analysis in the powder obtained The scanning electron micrographs show particles having a diameter of up to 10 μm, depending on the fineness of grinding, these particles, according to the scanning transmission electron micrograph, being composed of crystallites having a diameter of 15 to 30 nm. As can be seen from the dilatogram, the sinter maximum of the powder is 1134° C.

EXAMPLE 8

500.0 g of $ZrOCl_2.8H_2O$ and 25.5 g of $YCl_3.6H_2O$ are homogenized in a mortar. The mixture is melted in a glass flask while stirring and is refluxed for 15 minutes. 40.4 g of 2,2-dimethylpropane-1,3-diol are then added and the temperature is increased from 140° C. to 200° C. Evaporation of the $H_2O$ and HCl is supported by applying a vacuum of 4.5 kPa shortly before the powder becomes dry. The product is milled, calcined for one hour at 800° C. in a stream of air, comminuted slightly by milling and finally analyzed. The crystallite size is 15 to 20 nm. In the dilatogram, the powder shows a sinter maximum at 1161° C.

EXAMPLE 9

A melt of 100.0 g of $ZrOCl_2.6H_2O$ and 25.5 g of $YCl_2.6H_2O$ is prepared and is refluxed for 1 hour at a bath temperature of 140° C. 8.08 g of 2,2-dimethylpropane-1,3-diol are added to this melt, and the resulting melt is refluxed for a further 15 minutes. Partial formation of a fine yellowish white precipitate occurs. After evaporation of $H_2O$ and HCl, which is carried out towards the end of the process step in vacuo, the product obtained is milled and is calcined for one hour at 800° C. in a stream of air. The scanning transmission electron micrographs indicate a crystallite diameter of about 20 nm. The sinter maximum is found at 1154° C.

EXAMPLE 10

The experiment of Example 9 is repeated. However, the melt is refluxed for 16 hours. It has an opaque milky appearance. The crystallites of the powder obtained have a diameter of 30 to 50 nm, and the sinter maximum of the powder is 1175° C.

EXAMPLE 11

100 g of $ZrOCl_2.8H_2O$, 5.1 g of $YCl_3.6H_2O$ and 8.1 g of 2,2-dimethylpropane-1,3-diol are thoroughly mixed and then dimethylpropane-1,3-diol are thoroughly mixed and then melted. Fresh water is metered in at the rate at which $H_2O$ and HCl are distilled off. After 5 hours, no further water is added and the melt is dried. Heating is carried out at 200° C., after which the product is calcined for 1 hour at 800° C. in a stream of air. The crystallites of the powder have a diameter of about 25 nm and consist of 100% tetragonal phase.

EXAMPLE 12

A crude powder suitable for calcining is prepared, as described in Example 1. This product is calcined in a stream of air, first for one hour at 400° C. and then for one hour at 600° C. The powder obtained consists of 100% tetragonal phase. The crystallite thickness is 23 nm.

EXAMPLE 13

18.5 g of propane-1,2-diol, 78.3 g of $ZrOCl_2.8H_2O$ and 3.2 g of $YCl_3.6H_2O$ are melted while stirring and are refluxed for 2 hours at 140° C. After 28 g of hydrochloric acid have been distilled off and the product obtained has been calcined for one hour in a stream of air at 800° C. and then milled, a readily compressible and sinterable powder is obtained. The ratio of tetragonal to monoclinic phase is 95:5. The diameter of the tetragonal crystallites is 23 nm.

EXAMPLE 14

The experiment of Example 13 is repeated, except that calcination is carried out in two stages. In the first stage, the product is calcined for one hour at 500° C. in a stream of argon. The black powder formed is then heated in a second stage for one hour at 800° C. in a stream of air. The powder, which is now white, can be tabletted and sintered.

EXAMPLE 15

ZrOCl$_2$.8H$_2$O and propane-1,2-diol are processed in a molar ratio of 4:1 with the addition of YCl$_3$.6H$_2$O (5% of Y$_2$O$_3$, based on ZrO$_2$), as described in Example 13, to give ZrO$_2$ powder. The product obtained has a sinter maximum of 1134° C. in the dilatogram.

EXAMPLE 16

In this Example, the diol used is ethane-1,2-diol. The other conditions correspond to those of Example 15. The powder obtained has a crystallite size of 28 nm, and the tetragonal content is 74%. The sinter maximum is at 1172° C.

EXAMPLE 17

The experiment described in Example 13 is repeated using butane-1,3-diol. A powder which consists of 90% tetragonal phase and has a sinter maximum at 1268° C. is obtained.

EXAMPLE 18

A powder which contains 12 percent by weight of CeO$_2$ as a stabilizer is prepared. The preparation conditions correspond to those of Example 1. The yellow powder consists of 100% tetragonal phase. The crystallite size is determined as 21 nm with the aid of the X-ray diffraction patterns.

EXAMPLE 19

The experiment of Example 1 is repeated without the addition of a stabilizer. A powder which contains 98% monoclinic phase is obtained. The crystallite size is 66 nm.

COMPARATIVE EXAMPLE 100.0 g of ZrOCl$_2$.8H$_2$O and 5.2 g of YCl$_3$.6H$_2$O are melted without further additives and are processed to a powder as described in Example 1. This powder consists of hard agglomerates having a diameter of 0.5 to 1 μm, which cannot be pressed to give highly dense moldings and cannot be sintered.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of zirconium dioxide powder, comprising melting zirconyl chloride in the presence of a diol of the formula HO-Z-OH, wherein X is a saturated hydrocarbon radical of 2–5 carbon atoms, and recovering the product.

2. A process according to claim 2, wherein the melt is dried by evaporating off water and hydrogen chloride, the reaction product is calcined at elevated temperature in the presence of an oxygen-containing gas and, optionally, the calcined residue is milled.

3. A process according to claim 2, wherein a stabilizer precursor is added in the reaction of the zirconyl chloride.

4. A process according to claim 3, wherein yttrium chloride and/or cerium chloride are added as the stabilizer precursor.

5. A process according to claim 2, wherein the molar ratio of zirconyl chloride to diol is 10:1 to 1:10.

6. A process according to claim 2, wherein the molar ratio of zirconyl chloride to diol is 1:1 to 6:1.

7. A process according to claim 2, wherein the molar ratio of zirconyl chloride to diol is 2:1 to 5:1.

8. A process according to claim 2, wherein calcining is carried out at a temperature of 600° to 1000° C.

9. A process according to claim 2, wherein air is used as the oxygen-containing gas.

10. A process for the preparation of zirconium dioxide powder, comprising reacting melted zirconyl chloride with at least one diol of the formula HO-X-OH, wherein X is a saturated hydrocarbon radical of 2–5 carbon atoms, and recovering the product zirconium dioxide.

11. A process for the production of zirconium dioxide powder comprising melting a zirconium dioxide precursor in the presence of at least one diol of the formula HO-X-OH, wherein X is a saturated hydrocarbon radical of 2–5 carbon atoms, and recovering the product.

* * * * *

UNITED STATES PATENT AND TRADEMARK OFFICE
CERTIFICATE OF CORRECTION

PATENT NO. : 5,009,878

DATED : April 23, 1991

INVENTOR(S) : Helmut SCHARF

It is certified that error appears in the above-identified patent and that said Letters Patent is hereby corrected as shown below:

Col. 3, line 2, after "thereby" insert-- and sintered articles prepared out of this powder--.

Col. 3, line 32, delete "yttrium and cerium"

Col. 4, line 23, after "off" insert --too--.

Col. 5, line 4, change "teflon" to --Teflon--®.

Col. 5, line 53, delete "beforehand".

Signed and Sealed this

First Day of December, 1992

*Attest:*

DOUGLAS B. COMER

*Attesting Officer*     *Acting Commissioner of Patents and Trademarks*